Feb. 4, 1936. O. R. STRAWN 2,029,512
MATERIAL HANDLING MECHANISM
Filed April 8, 1933 5 Sheets-Sheet 1

INVENTOR:
Orval R. Strawn,
By
Chas. M. Nissen,
ATT'Y.

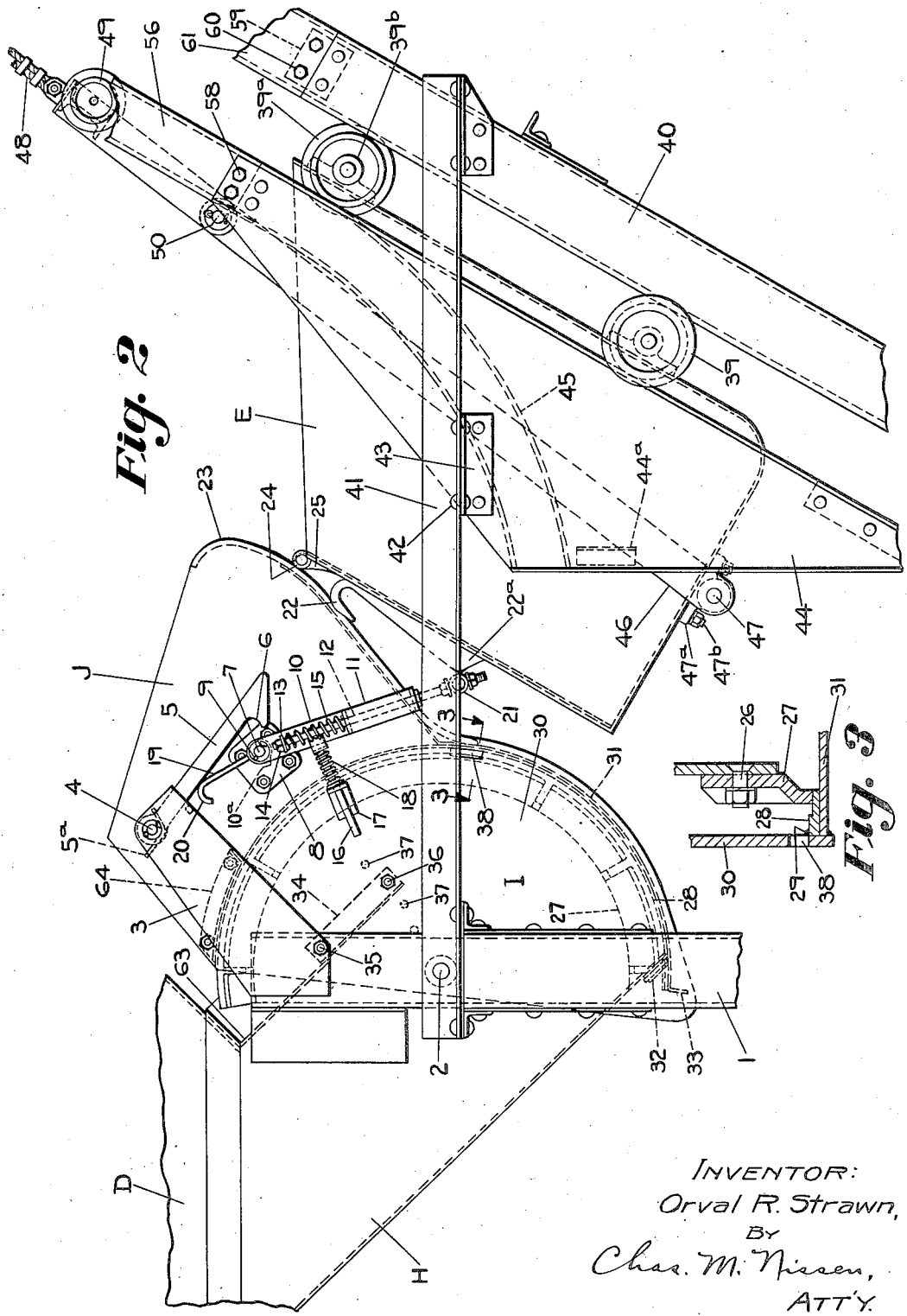

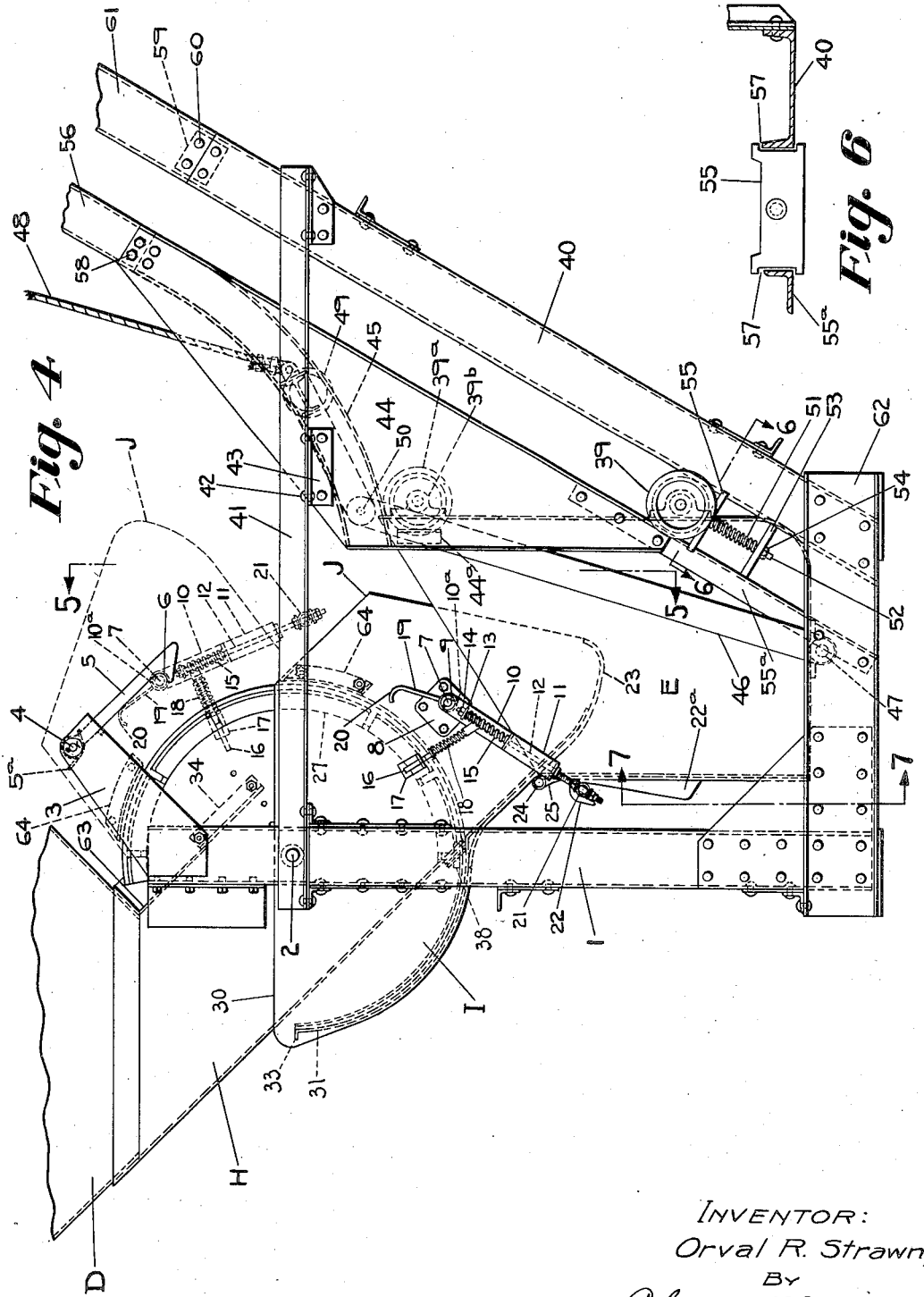

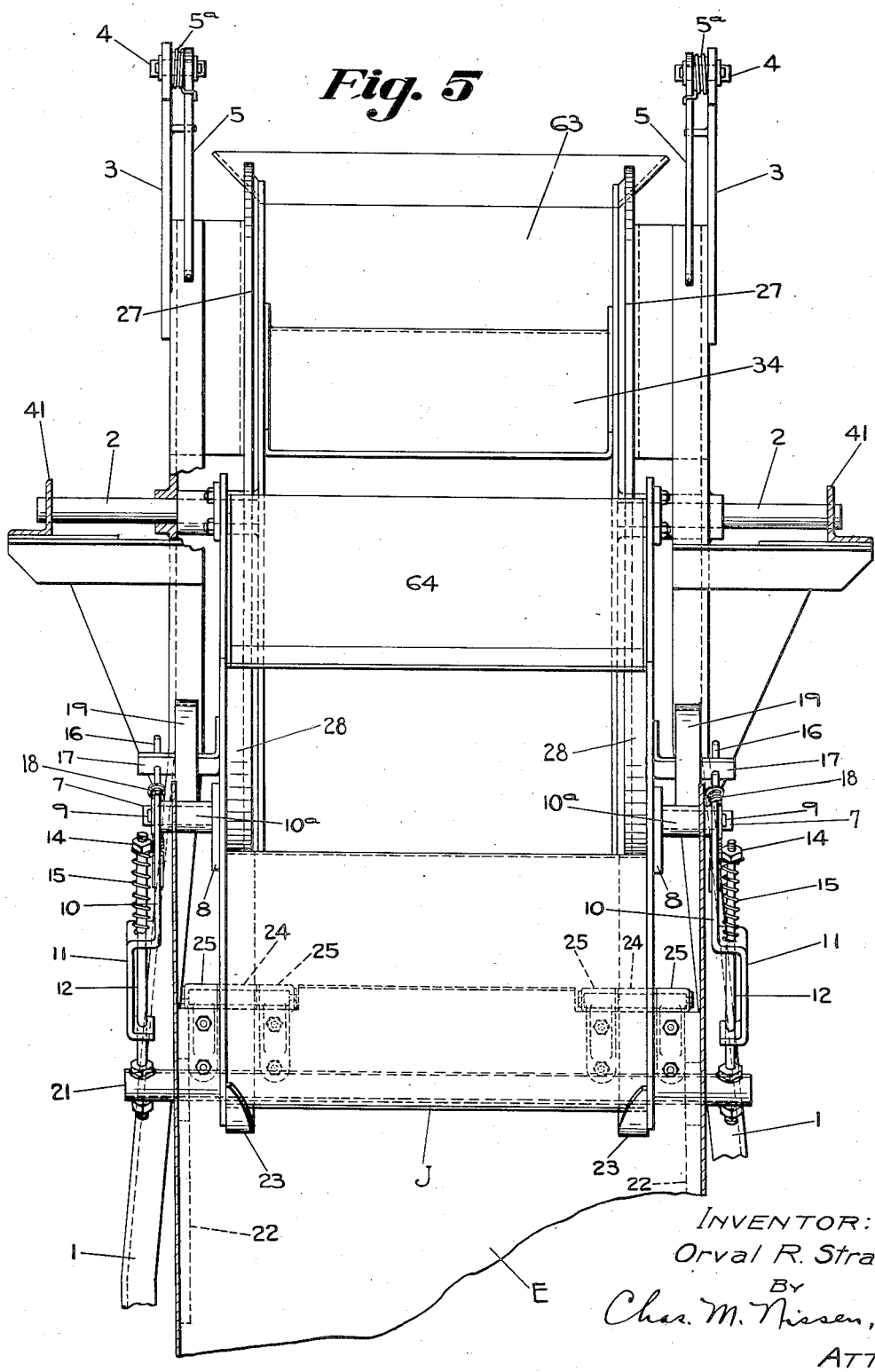

Feb. 4, 1936.   O. R. STRAWN   2,029,512
MATERIAL HANDLING MECHANISM
Filed April 8, 1933   5 Sheets-Sheet 5

INVENTOR:
Orval R. Strawn,
By
Chas. M. Nissen,
ATT'Y.

Patented Feb. 4, 1936

2,029,512

UNITED STATES PATENT OFFICE 2,029,512

MATERIAL HANDLING MECHANISM

Orval R. Strawn, Columbus, Ohio, assignor to The Jeffrey Manufacturing Company, a corporation of Ohio Application April 8, 1933, Serial No. 665,141

23 Claims. (Cl. 214—125)

In unloading materials such as coal, gravel, or the like, from delivery cars and transferring the materials to storage bins, it is a widely practiced procedure to unload the materials by transferring the same from the delivery car into a hopper of rather limited capacity, suitably positioned adjacent and beneath the car, and then transferring the materials from the hopper to large capacity storage receptacles or bins through the use of a skip hoist mechanism, including a suitable bucket adapted to receive the material from the hopper, and to discharge the same into the storage bins, together with suitable hoist instrumentalities for operating the skip bucket between its loading and discharging positions.

In order to guide the materials from the charging hopper into the skip bucket, it is customary to provide the hopper with a downwardly extending chute, the discharge end of which is controlled by a movable gate or valve which is operated by movement of the skip bucket into and away from charging position, the operation of the aforesaid valve being automatically responsive to the aforesaid movements of the skip bucket. In this way, discharge of material from the loading hopper can take place only when the skip bucket is in position to receive the materials, the discharge of the materials from the hopper being stopped by the closing of the valve as the loaded bucket is raised.

For directing the flow of material from the loading hopper, when the control valve is open, the valve is provided with an auxiliary chute or extension which registers with the chute of the hopper when the valve is open, and which is provided with means for preventing overflow of material from the skip bucket when the latter is loaded. The valve is also provided, customarily, with a counterweight for maintaining the valve in closed position.

In view of the fact that the skip charging hopper is positioned below the delivery car, so that the car may be unloaded directly into the hopper, it is necessary either to run the car onto an elevated trestle structure so as to position the car above the open mouth of the hopper, or else the hopper is positioned in a pit beneath the car. In either event, the skip bucket has to be positionable adjacent the discharge end of the chute.

For operating the bucket, it is mounted on suitable guides or tracks along which run rollers carrying the bucket. The bucket is provided with a bale to which is attached a hoist cable which is passed over sheaves to a drum driven from a suitable source of power.

The present invention relates to apparatus of this general type, but incorporates certain novel improvements over prior constructions, as will become more clearly apparent hereinafter.

In general, the present invention provides an improved skip hoist apparatus which has, among other advantages, an improved valve construction for the hopper, which eliminates the use of the counterweight above referred to; which incorporates a novel latching mechanism operable responsively to movements of the skip bucket into and out of loading position; which incorporates an improved type of gate or valve for controlling flow of materials from the hopper, the valve embracing a novel feature, incorporating a relative cooperative movement with the bucket, which brings both in a position for preventing overflow of materials from the skip bucket.

The invention also embraces an improved skip bucket designed to co-act with the hopper and valve, aforesaid, this bucket being provided with instrumentalities assuming operable engagement with the valve mechanism for automatically operating the latter incident to movement of the bucket into, and away from, full loading position.

Also, there may be specifically mentioned the provision of instrumentalities for swinging the bucket into a vertical position as it reaches charging position thereby enabling installation of the apparatus into a pit of substantially less depth than has been possible heretofore.

Further, the invention embraces an apparatus of this character in which the co-operating parts can be installed as a unit, and which, because of the simplicity of the construction of the elements, can be built and installed with a high degree of economy.

Advantages other than those above specifically pointed out will become apparent as the description proceeds and the details of the invention will be more readily understood from reference to the accompanying drawings, in which:

Fig. 2 is a detail view in elevation of the skip bucket and improved hopper valve of this invention, the bucket being shown approaching or leaving its loading position;

Fig. 3 is a sectional view taken on the line 3—3 of Fig. 2.

Fig. 4 is a view similar to Fig. 2 but showing the skip bucket in loading position, the view also indicating the change in position of the hopper valve when in closed and open positions;

Fig. 5 is a sectional view of the structure shown in Fig. 4, the view being taken on the plane of the line 5—5 of Fig. 4, looking in the direction of the arrows;

Fig. 6 is a section taken on line 6—6 of Fig. 4 looking in the direction of the arrows;

Figure 1:
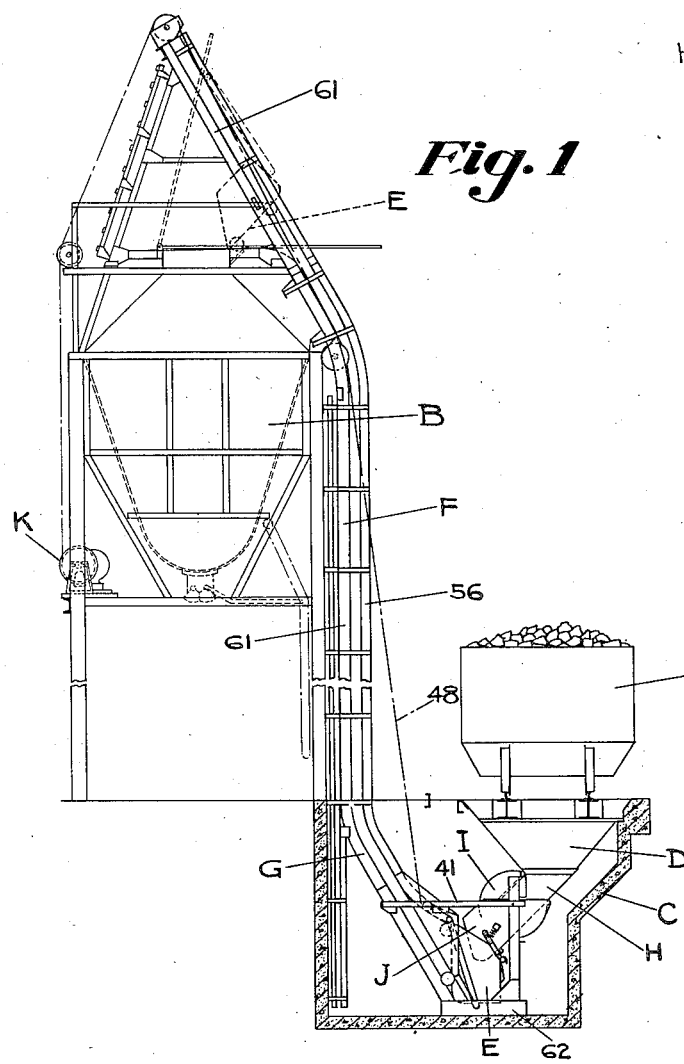
Fig. 1 represents in a rather diagrammatic manner an installation embracing the features of the present invention.
Figure 10:
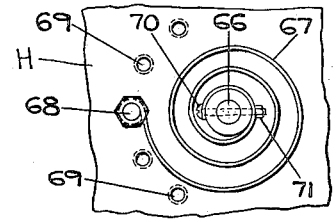
Fig. 10 is an enlarged fragmentary view of a tension adjusting means for the baffle plate spring shown in Fig. 8.
Figure 11:
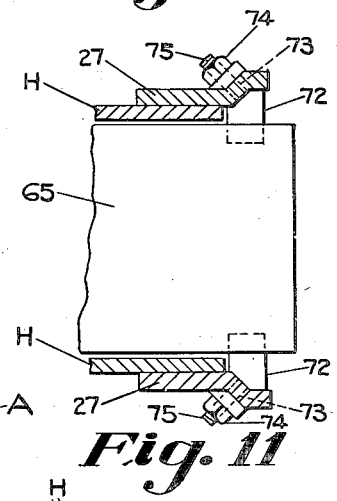
Fig. 11 is a sectional view on line 11—11 of Fig. 8, looking in the direction of the arrows and showing adjustable instrumentalities for stopping the baffle plate.
Figure 12:
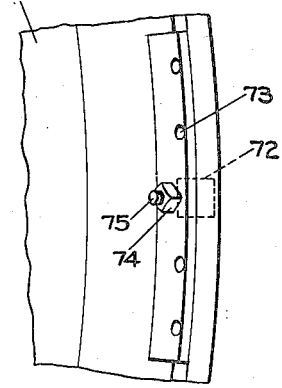
Fig. 12 is an enlarged elevational view of the mounting of the stopping instrumentalities shown in Fig. 11.
Figure 7:
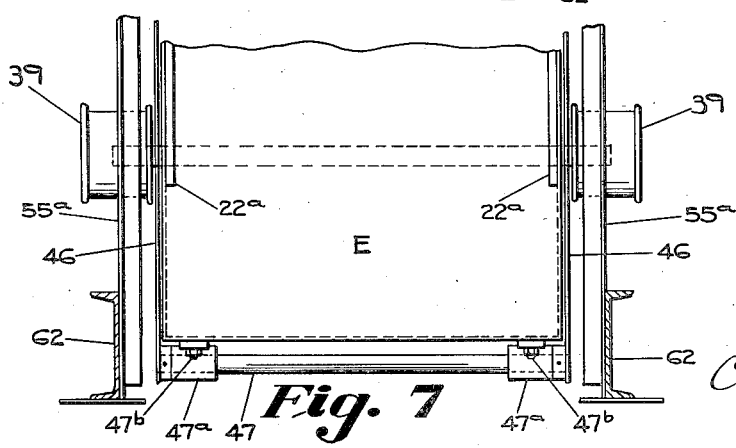
Fig. 7 is a section taken on line 7—7 of Fig. 4, looking in the direction of the arrows.

Referring more particularly to the drawings, it will be seen that the installation is intended to convey material such as coal, gravel and the like, contained in a car A to large capacity storage receptacles or bins B. For this purpose, there is shown positioned within the pit C, and beneath the car A, the hopper D, disposed beneath the car, and adapted to receive materials directly from the car. For conveying the material from the hopper D to the storage bin B, there is employed a skip bucket E which receives material from the hopper D, and which is arranged to lift the materials along the tracks F to its discharge position, indicated in dotted lines in Fig. 1, where it discharges its contents into the bin B. Suitable hoist mechanism, forming no part of the subject matter of this invention, and therefore shown only diagrammatically at K in Fig. 1, is employed for actuating the bucket E.

As has been already mentioned, the present invention embraces a plurality of co-acting elements forming a unitary assembly, which embraces the hopper D, the skip bucket E, and the lower portion G of the guide tracks along which the bucket travels; and all of these elements are contained in, or are adapted to enter, the pit C.

The present invention deals specifically with the improvements in the chute and valve construction, in the construction of the skip bucket itself, and in the track along which the bucket travels, the more especially that portion of the track which extends into the pit C.

The hopper mechanism involved in the present invention more particularly embraces the construction of the gate or valve governing discharge of material from the hopper.

It will be apparent that the hopper D is provided with the downwardly extending chute H which is controlled by the gate or valve indicated generally at I, and which is provided with an auxiliary chute J. As is well understood in the art, the gate I is turnable as the bucket E moves into and out of loading position, so that the auxiliary chute J is brought into and out of registry with the chute H.

It will be seen that the chute H is supported by standards 1 through which extend the trunnions 2 upon which the valve I is turnably mounted. The valve I is maintained in closed position relative to the chute H when the bucket E is away from loading position, through the provision of releasable latch mechanism, which will now be described, and which will be understood to be duplicated on both sides of the apparatus.

Mounted on the standard 1 are brackets 3, to which brackets are pivotally mounted, on shafts 4, latch arms 5, each of which has a hook portion 6 adapted to engage boss or hub portions 10a mounted for swinging movement on rods 7, each of these rods being in the nature of stub shafts integral with brackets, or equivalent mounting members, 8, secured to the sides of the auxiliary chute J. Latch 5 is held in position by spring 5a.

The hub portions 10a mounted on the rods 7 are secured from lateral movement by cotter pins 9, and are integral with the arms 10. These arms have an offset portion 11 through which is passed a rod 12. Each rod 12 has secured to it, adjacent the upper end of the rod, a collar 13, and is held in position by a nut 14 threaded on the end of the rod 12 and bearing against the collar 13. A shock absorbing spring 15 is positioned between the collar 13 and the flange portion 11 of the arm 10, this spring serving to yieldingly mount the rod 12 on the arm 10.

The arm 10 is held in desired position of adjustment by means of a second arm 16 slidably mounted in a bracket 17 secured to the side of the valve I, there being a spring 18 between the bracket 17 and the end of the rod 16 which is pivoted to the aforesaid arm 10.

Integral with hubs 10a and turnable therewith on shaft 7, are the extensions 19 provided with cam ends 20 adapted to engage the latch 5, and tending to unseat this latch upon engagement of the bucket E with the mechanism just described.

For effecting this purpose, there is provided a bar or pipe 21 carried by and interconnecting the rods 12, previously described. This bar 21 is adapted to be engaged by hook members 22 mounted for this purpose on the skip bucket E. Therefore, when the bucket comes into loading position, the hooks 22 engage the bar 21 to tend to pull the rods 12 downwardly, at the same time imparting a turning movement to the arms 10 on the shafts 7 and moving the extensions 19 against the latches 5 so as to cause the cam surfaces 20 to lift the latches 5 from engagement with the hubs 10a. The chute J, when released, is free to ride downwardly on the bucket against the rollers 24 as the bucket moves into loading position. If there is any tendency of the valve J to stick, the hooks 22 will pull upon the bar 21 to move the chute J. The springs 15 cushion the movement of the rods 12, and the springs 18 serve to cushion the turning of the arms 10. Continued lowering of the skip bucket pulls the auxiliary chute J and valve I in a downward direction, the valve I turning on trunnions 2 until the auxiliary chute J coincides with the chute H from the hopper D. Therefore, when the skip bucket E is fully lowered, the gate I will have been completely opened, and the material is free to flow from the hopper D into the bucket E.

There is, however, a further incidental action taking place for facilitating the release of the latch 5. It will be observed that on the bottom of the auxiliary chute J are secured cam-shaped strips 23, these cam strips being adapted to be engaged by rollers 24 mounted between offstanding brackets 25 secured to the bucket. Therefore, as the bucket moves into engagement with the strips 23 of the chute J, an upward turning movement is imparted to the chute J and valve I sufficient to initially disengage the hooks 6 of the latches 5 from the hubs 10a, so that the extensions 19 may completely and easily lift the latches 5 clear from the hubs 10a as the lower ends 22a of hooks 22 come in contact with the bar 21 in the downward travel of the bucket.

It has been said that the valve I is turnably mounted on the trunnions 2. To the chute H is secured by bolts 26 a casting 27, of an arcuate configuration, this casting abutting against a track member or guide 28, welded at 29, or otherwise permanently affixed, to the side walls 30 of the valve I. This track member 28 forms a wearing strip for the casting 27 and also forms a seal to keep material from getting between the sides of the chute H and the sides 30 of the valve I as the valve opens and closes. Against the bottom plate 31 there operates a wiper 32 mounted on the chute H, for facilitating movement of material to the auxiliary chute J as the latter is turned to discharging position. The plate 31 is bent along its rear transverse edge into a reinforcing flange 33 which resists any tendency of the plate 31 to buckle.

A top portion of chute H is provided with an adjustable regulating and brace plate 34 pivotally mounted on a bolt 35 in each side of the chute and positioned at the desired angle of inclination by a bolt 36, registering with one of a plurality of holes 37 in each side wall of the chute H and positioned on an arc of which the bolt 35 is the center and the distance between the bolts 35 and 36 is the radius. It will be seen from the above described construction that the inclination of the brace plate 34 relative to the chute H may be adjusted to regulate the flow of material from the hopper D into the skip bucket E.

An opening 38 is provided in each side plate 30, to enable any fine materials, which may get between the side plates 30 and the castings 27 to work their way out, thus preventing any tendency of the valve to bind during operation because of the presence of fine materials between the moving parts.

Referring now more particularly to the bucket construction it has been pointed out how the bucket is provided with the hook members 22 for engaging the bar 21 and also that engagement of the rollers 24 with the specially shaped cam 23 of the auxiliary chute J releases the latch 5 so that as the bucket E removes to its loading position, the engagement of the hooks 22 with the bar 21 enables the valve I to swing open around the trunnions 2, until the auxiliary chute J alines with the chute H and the material passes into the bucket. It will be seen that the bucket E is mounted on wheels 39 and 39a which travel along guides 40 of the supporting frame. Standards I and guides 40 are suitably braced by angle bars 41. Riveted to each angle bar 41, as indicated at 42, is a bracket 43, which is in turn riveted to a plate 44 which is spaced from the guides 40 sufficiently far for the wheels 39a to enter therebetween. The plates 44 are roughly in the shape of an oblique triangle, there being mounted thereon arcuate guide tracks 45 extending from what corresponds to the apex of the plates 44 to one corner of the base.

The bucket E is provided with a bale 46 having pivotal connections 47, with brackets 47a secured by bolts or the like, 47b, to the bucket, a hoist rope 48 being secured to the bale. Rollers 49 are mounted on the bale and are guided on the tracks 45. Adjacent to each upper end of the bale 46 is a hinge 50, and by virtue of this hinge and the pivots 47, the bale is enabled to take the position shown in Fig. 4, allowing the bucket to swing around the lower wheels 39 to assume a substantially vertical position for loading. The gate and auxiliary chute then assume the full-line position of Fig. 4 and the contents of the hopper D flow into the bucket E until the latter is filled.

During this filling operation the proper deflecting of the material is facilitated by the brace member 34, the material flowing into the bucket until the latter is filled up to where the material reaches its angle of repose. The auxiliary chute J extends into the bucket E sufficiently far so that the material comes to rest at a level substantially below the top of the bucket. Furthermore, the shape of the end of the auxiliary chute J is such that, as the filled bucket is withdrawn, the chute will scoop up all excess material that may have flowed down, and this material is either retained in the chute as it swings upwardly in response to the upward movement of the bucket, or flows back through the valve into the chute H during the closing action of the valve. As the loaded bucket is lifted, the engagement of bale 46 with the hubs 39b of rollers 39a causes the bucket to assume the position illustrated in Fig. 2.

As the valve I rotates back and forth under corresponding engagement of the bucket E, any fine material which works between plates 30 and castings 27 can escape through vent 38 and thus does not interfere with the operation of the valve.

At the bottom of the tracks 40 there are positioned springs 51, each mounted on a bolt 52, carried in a plate 53 and held in position by a nut 54. Yieldingly mounted on the spring 51 is the plate 55, engageable by the lower wheel 39 of the bucket E. By this means, the bucket is cushioned as it reaches its loading position.

Reviewing the operation of the apparatus, it will be recalled that the mechanism, including the hopper D, chute H, valve I, auxiliary chute J, together with the parts mounted thereon, the bucket E, and frame members 1, 40 and 41, together with plates 44 and guides 45 thereon, and base members 62, all mutually cooperate one part with the other and form an assembly of interrelated parts forming a unitary structure.

Now assuming the parts to be in a position with the valve I closed and the auxiliary chute J in raised position, as indicated by the dotted line position in Fig. 4, and the bucket E in non-loading position and located slightly above the position illustrated in Fig. 2 and moving downwardly to be filled, the latch 5 on each side of the auxiliary chute J will have its hook 6 in latching engagement with the corresponding extending hub portion 10a of the arm 10, the auxiliary chute J being thereby held in substantially upright position and the valve I maintained accordingly closed, thereby preventing flow of material from hopper D and chute H. The arm 19, bearing against the latch 5, exerts a spring pressure thereagainst, but the shape of the hook 6 prevents disengagement of the latch from the hub 10a, the hook 6 extending sufficiently far around the hub to prevent accidental displacement of the hook from the hub.

As the bucket E moves along track 40 towards loading position, the rollers 24 engage the cam-shaped strips 23 of the auxiliary chute J, the passage of the rollers over the strips 23 lifting the chute J until the hooks 6 slip off from the hubs 10a sufficiently to enable the ends 22a of the hooks 22 to rotate the arms 10 and their extensions 19 about the shafts 7 to lift the latches 5 completely out of engagement from the hubs 10a, thereby freeing the chute J for rotation about the shaft, or trunnions, 2.

Almost immediately after the release of the latch mechanism, the hooks 22 engage the bar 21 interconnecting arms 19 to start the chute J to turn downwardly. Continued downward movement of the bracket E is accompanied by the turning of the auxiliary chute J and valve I around trunnions 2 until the valve I opens coincidently with the bucket E reaching loading position, the hooks 22 pulling upon bar 21 to overcome any tendency of the valve I to stick or bind. As the bucket E reaches loading position, it is swung into a substantially vertical position around the wheels 39, the wheels 39a following the course of the tracks 45 and coming to rest adjacent snubbers 44a, the hinged connections between the sections of the bale 46 enabling these sections to relatively bend, as shown in Fig. 4, thus allowing the bucket E to come into the vertical position as the valve I opens to enable the hopper to discharge into the bucket. Material from the hopper D then flows into the bucket to fill the bucket up to the angle of repose of the material. Normally, the rollers 24 on the bucket continuously support the auxiliary chute J when hooks 5 are disengaged from hubs 10a.

When the bucket is filled, the hoisting instrumentalities, shown diagrammatically at K in Fig. 1, are actuated to raise the bucket. The tension on rope 48 aligns the sections of bale 46 which strike the axle of wheels 39a as the bucket is swung from loading position, the bucket swinging around its lower wheels 39 until both pairs of wheels 39, 39a engage the tracks 40. This action turns the rollers 24 against the bottom of the auxiliary chute J to initially turn the said chute to effect a scooping of excess material from the charge in the bucket, thereby preventing spillage as the bucket is lifted. As the lifting operation progresses, the rollers 24 continue their engagement with the bottom of the auxiliary chute J, thereby continuing to lift this auxiliary chute and closing the valve I, the material contained in the auxiliary chute falling back into the main chute H as the valve I closes. Finally, as the bucket E withdraws from engagement with the auxiliary chute J, the latter has been lifted so that the hooks 5 are again in locking engagement with the hubs 10a, thereby locking the auxiliary chute J in upward position, the valve I thereby being maintained closed, until the bucket E is again lowered to charging position when the above operation is repeated.

It will be observed that the guides 45 register with the guides 56, the plates 44 being joined to the latter through the instrumentality of bolts or rivets 58, the tracks or guides 40 being similarly joined by plates 59 and bolts or rivets 60, to the guides or tracks 61. The track or guide members 56 and 61 form rails between which the wheels 39 and 39a of the bucket E travel, as the bucket is raised and lowered, the members 56 and 61 continuing to the top of the frame structure which carries the hopper B into which the bucket E is adapted to discharge.

It will be noted that when the bucket is in loading position, it is supported in a substantially vertical position on the resiliently supported plates 55, the springs 51 being accordingly compressed. Plates 55 are notched, as indicated at 57 for guiding engagement with tracks 40 and braces 55a for plates 44. It will be understood that plates 44 are flanged to continue the tracks for wheels 39. The wheels or rollers 39a abut against stops 44a secured to the inner surface of the plates 44. This means, therefore, that the bottom of the bucket is practically horizontal and a substantial saving in space is thereby accomplished. In the construction of this apparatus, the sides of auxiliary chute J are spaced a sufficient distance from the sides of the bucket to form a space for overcharge of material as the bucket is raised, thereby assisting in preventing overflow of the bucket. The side plates of this auxiliary chute extend above the lower edge of the brace plate 34. Since this brace plate is connected with the upper wall 63 of the chute H through the mounting 35, it forms an extension of this wall, and the adjustability of the mounting 36 of the plate enables the plate to vary the elevation of the emerging surface of the discharging materials. The position of this plate 34 therefore alone determines the spread of material from the chute H in accordance with the angle of repose thereof, the plate 34 constituting means separate and independent of the auxiliary chute for effecting stoppage of flow of material from the chute H when the bucket is filled, the action of plate 34 being supplemented if desired, by the provision of a second brace plate 64 extending across the auxiliary chute J.

It has been pointed out also that the bottom of the auxiliary chute J serves to scoop any excess material out of the bucket E as the bucket is lifted. The shape of strips 23 provides a means for initially lifting the chute J as the rollers 24 contact therewith on downward movement of the bucket, for releasing the latch mechanism; and the curvature of the strips 23 also enables the auxiliary chute J to be fully restored to its initial position as the bucket E is lifted after loading thereof.

Figure 8:
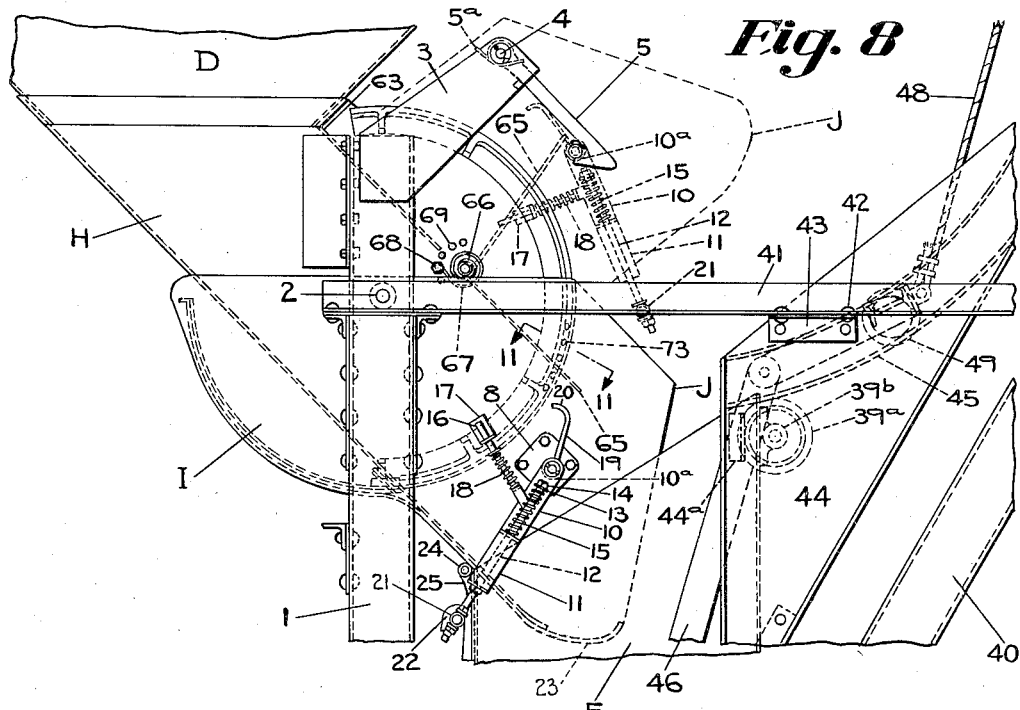
Fig. 8 is a fragmentary view similar to Fig. 4 showing a somewhat modified form of device for stopping the flow of material from the hopper when the skip bucket becomes filled.

Referring to Fig. 8, it will be seen that the side wall of chute H may be provided with a baffle plate 65 turnably mounted on suitable shaft members 66. This baffle plate 65 is provided and arranged to stop the flow of material passing through chute H from hopper D when the bucket E has reached its loading position and has become filled with the material to the desired height. For actuating the baffle plate 65, there is provided the spiral spring 67, one end of which is secured to a bolt, or the like, 68, which is removably inserted in one of a plurality of holes 69, disposed in an arc concentric with the shaft members 66, which members may be either a pair of stub shafts extending through opposite sides of the chute H, or a single shaft extending from side to side of the chute. In the former case the spring 67 is duplicated on both sides of the chute, while in the latter instance the spring extends along the shaft sufficiently to impart a vigorous rotative motion to the shaft. In any event, the other end of the spring is secured to the shaft 66 by means of a machine screw, or the like, 70, held in place by a nut 71. It will be apparent that the tension of the spring acting upon the shaft 66 may be adjusted by inserting the bolt 68 in the different holes 69, which adjusts as may become necessary, the force of rotation turning the plate 65. For limiting the downward movement of the plate 65, adjustable stop members 72 are provided which are inserted through holes 73 in the periphery of the valve I, the stops 72 extending inwardly sufficiently far to engage, in a positive manner, the plate 65, thereby adjusting the angle in which the plate 65 is positioned, with corresponding adjustment of the stopping of the flow of material into the bucket E, the wider the angle in which the plate is positioned, the greater will be the flow of material, and contrarily. When the bucket E is raised from loading position, with accompanying lifting of auxiliary chute J and closing of valve I, the material remaining in the chute J lifts the plate, with the chute, against the tension of spring 67, as indicated by the dotted lines in Fig. 8. The stop members 72 are held in position in holes 73 by nuts 74, threaded on stems 75 of the stops.

Figure 9:
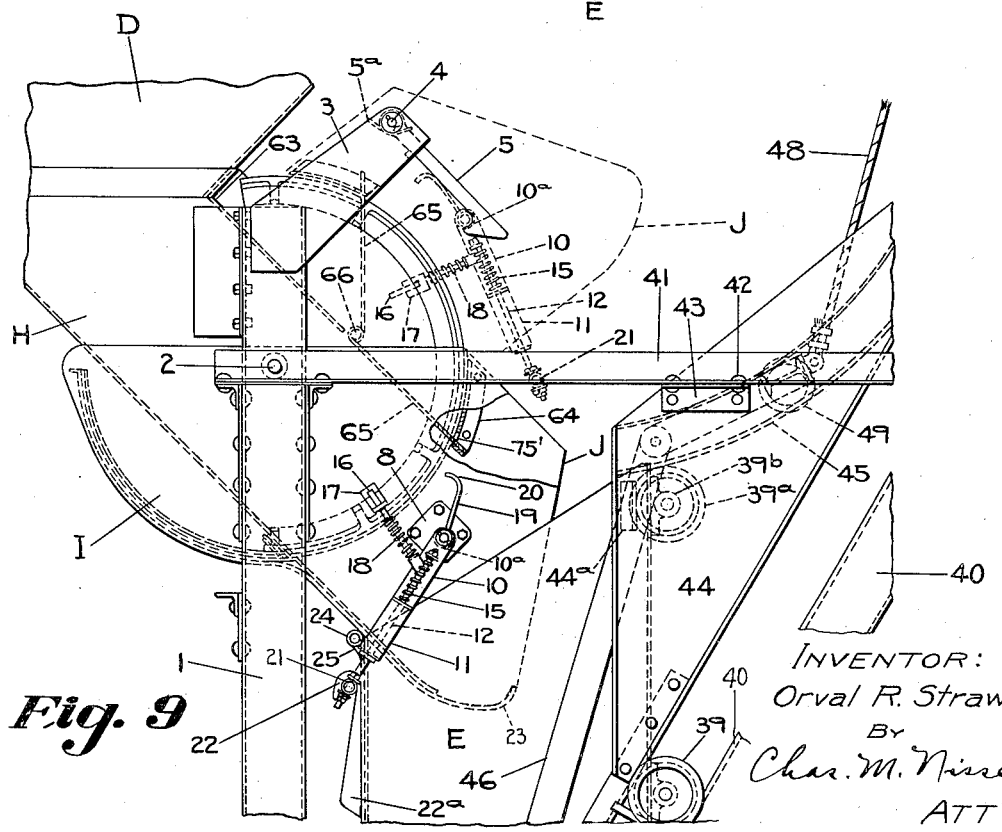
Fig. 9 is a view similar to Fig. 8 but showing a still different form of device for stopping the flow of material.

In Fig. 9 there is shown a still different form of mechanism, in which the plate 65 projects through an aperture 75' in the brace plate 64, so that the plate is turned with shaft 66 responsive to movement of the brace plate 64 and valve I. The action of the plate 65 is the same as in Fig. 8, but in the construction of Fig. 9, spring 67 of Fig. 8 is omitted.

From the above considerations, it will be seen that the mechanism including the hopper D, chute H, valve I, and auxiliary chute J, collectively forms a batcher for loading the bucket E; and since the auxiliary chute is provided with means for preventing overflow of the bucket E, the auxiliary chute may be regarded as defining a measuring chamber for measuring the materials from the hopper D into the bucket E.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In material handling apparatus, the combination with a chute, of a valve having the shape of a segment of a cylinder, arcuate guides for said valve, vertical enclosure plates connected to the outer edges of the valve and spaced from said guides, and a pivotal support for said enclosure plates to hold the valve in engagement with the guides, the plates having egress openings adapted to occupy their lowest positions when the valve is open.

2. In hoisting apparatus, the combination with a bucket, of hoisting mechanism therefor, a discharge chute, a pivoted valve for the chute, an auxiliary chute for discharging material from the discharge chute into the bucket when the latter is in loading position, a baffle plate within the valve and extending into the auxiliary chute for stopping flow of material passing from the discharge chute into the bucket, and a spring for actuating the said baffle plate as the auxiliary chute assumes its bucket-charging position.

3. In hoisting apparatus, the combination with a bucket, of hoisting mechanism therefor, a discharge chute, a pivoted valve for the chute, an auxiliary chute for discharging material from the discharge chute into the bucket when the latter is in loading position, a brace plate mounted in the auxiliary chute and extending transversely thereof, and a baffle plate mounted within the valve and carried by the said brace plate for stopping flow of material passing from the discharge chute into the bucket as the auxiliary chute assumes its bucket-charging position.

4. Hoisting apparatus comprising the combination with a skip bucket and cooperating loader, of inter-connecting members serving normally to lock the loader positively against displacement in inactive position but automatically actuable to release the same when the bucket approaches loading position, means for imparting a preliminary impulse to the loader for releasing the said inter-connecting members incidentally to the bucket approaching loading position, mechanism engageable by the bucket for actuating the said interconnecting members to release them from locking position, and means for yieldably maintaining the said mechanism in position to be engaged by the bucket upon the bucket approaching loading position.

5. Hoisting apparatus comprising the combination with a skip bucket and cooperating loader, of gravity influenced members serving normally to lock the loader positively against displacement in inactive position but automatically actuable to release the same when the bucket approaches loading position, means for imparting movement to the loader for releasing the said members incidentally to the bucket approaching loading position, and means on the said gravity-influenced members for positively but yieldingly maintaining the said members in locking position.

6. Hoisting apparatus comprising the combination with a skip bucket and cooperating loader, of locking members serving normally to lock the loader positively against displacement in inactive position, but automatically actuable to release the same when the bucket approaches loading position, means for imparting movement to the loader for releasing the locking members incidentally to the bucket approaching loading position, and springs on the locking members for positively but yieldingly maintaining the said members in locking position.

7. Hoisting apparatus comprising the combination with a skip bucket and cooperating loader, of latch members serving normally to secure the loader positively against displacement in inactive position, but automatically actuable to release the same when the bucket approaches loading position, and means for imparting movement to the latch members incident to the bucket moving into loading position, the said means including arms mounted on the loader, a member interconnecting the arms and disposed in the path of the descending bucket for turning the loader from inoperative to operative position as the bucket comes into loading position, cam devices connected with the arms and engaging the latch members to impart a lifting movement to the latch devices, and means yieldably maintaining the said arms in position to be engaged by the bucket as it moves past the loader.

8. Hoisting apparatus comprising the combination with a skip bucket and cooperating loader, of members serving normally to secure the loader positively against displacement in inactive position, but automatically actuable to release the same when the bucket approaches loading position, and means for imparting movement to the latch members incident to the bucket moving into loading position, the said means including arms mounted on the loader, an interconnecting member for the arms, hook devices on the bucket for engaging the said interconnecting member as the bucket approaches loading position, cam devices connected with the arms and engaging the latch members to impart a lifting movement to the latch members, and springpressed arms engaging the aforesaid arms for urging the interconnecting member for the arms into the path of the hook devices on the bucket to assure operative engagement therebetween.

9. Hoisting apparatus comprising the combination with a bucket, of an upstanding trackway therefor along which the bucket moves to and from loading position, the said trackway being provided with fixedly mounted auxiliary guide sections adjacent the loading position of the bucket, and means on the bucket cooperating with the said auxiliary sections to tilt the bucket vertically as the bucket moves into loading position, the said means including a hinged bale secured to the bucket and rollers adjacent the hinges and running on the said guides.

10. Material handling mechanism comprising a batcher including a charging hopper, a chute communicating with the hopper, an auxiliary chute adapted to interconnect the aforesaid chute with a receptacle for loading the receptacle and forming a measuring chamber for the materials being charged into the receptacle, means enabling the measuring chamber to be swung relatively to the chute for establishing and stopping flow of materials therefrom, and means for preventing any substantial quantities of materials passing between the said measuring chamber and the chute, the said chute being provided with a vent for discharging any materials working in between the chute and measuring chamber.

11. In material handling mechanism, the combination with a loader including a charging hopper, of a chute communicating with the hopper, an auxiliary chute adapted to inter-connect the aforesaid chute with a receptacle for loading the receptacle and forming a valve chamber for the materials to be charged into the receptacle, means enabling the valve chamber to be swung relative to the chute for establishing and stopping the flow of materials therefrom, and means for preventing any substantial quantities of materials passing between the chute and said valve chamber, a wall of said valve chamber being provided with a vent for discharging any materials working in between the valve chamber and the chute.

12. In hoisting apparatus, the combination with a bucket provided with vertically displaced rollers, of an inclined, upwardly-extending trackway comprising spaced guide rails along which the bucket moves and between which said rollers are guided as said bucket moves to and from loading position, the lower of said rails making substantially a constant angle with a horizontal plane adjacent the bucket loading position, and the upper of said rails diverging therefrom and making a decreasing angle with said horizontal plane as it approaches the bucket loading position, the upper of said rollers coming to rest adjacent the upper of said rails and the lower of said rollers coming to rest upon the lower of said rails when the bucket reaches a loading position.

13. In hoisting apparatus, the combination with a bucket provided with vertically displaced rollers, of an inclined, upwardly-extending trackway comprising spaced guide rails along which the bucket moves and between which said rollers are guided as said bucket moves to and from loading position, the lower of said rails making substantially a constant angle with a horizontal plane adjacent the bucket loading position, and the upper of said rails diverging therefrom and making a decreasing angle with said horizontal plane as it approaches the bucket loading position, one of said rollers coming to rest adjacent the upper of said rails and the other of said rollers coming to rest upon the lower of said rails when the bucket reaches a loading position.

14. In hoisting apparatus, the combination of a bucket provided with rollers, of an inclined, upwardly-extending trackway comprising spaced guide rails along which the bucket moves and between which said rollers are guided as said bucket moves to and from loading position, said rails extending along divergent paths adjacent the bucket loading position, a bail comprising a plurality of pivoted links pivoted at one end to the lower part of said bucket and carrying a roller at the other end, said bail roller moving in a path along one of said divergent rails when said bucket approaches a loading position, one of said bail links tending to rotate said bucket about one of said bucket rollers as said bucket is lifted from said loading position.

15. In hoisting apparatus, the combination with a bucket provided with vertically displaced rollers, of an inclined, upwardly-extending trackway comprising spaced guide rails along which the bucket moves and between which said rollers are guided as said bucket moves to and from loading position, the lower of said rails making substantially a constant angle with a horizontal plane adjacent the bucket loading position, and the upper of said rails diverging therefrom and making a decreasing angle with said horizontal plane as it approaches the bucket loading position, a bail comprising a plurality of pivoted links pivoted at one end to the lower part of said bucket and carrying a roller at the other end, said bail roller moving in a path along the upper of said rails when said bucket moves to a loading position, the upper of said bucket rollers following said upper rail and the lower of said bucket rollers following said lower rail as the bucket moves to a loading position, one of said bail links tending to rotate said bucket about the axis of said lower bucket roller and moving said upper bucket roller away from said upper rail and towards said lower rail preliminary to the lifting of said bucket from said loading position.

16. In hoisting apparatus, the combination with a bucket provided with vertically displaced rollers, of an inclined, upwardly-extending trackway comprising spaced guide rails along which the bucket moves and between which said rollers are guided as said bucket moves to and from loading position, the lower of said rails making substantially a constant angle with a horizontal plane adjacent the bucket loading position, and the upper of said rails diverging therefrom and making a decreasing angle with said horizontal plane as it approaches the bucket loading position, the upper of said bucket rollers following said upper rail and the lower of said bucket rollers following said lower rail as the bucket moves to a loading position, and means adapted to rotate said bucket about the axis of said lower roller to move said upper roller away from said upper rail and towards said lower rail preliminary to lifting said bucket from said loading position.

17. In hoisting apparatus, the combination with a bucket provided with vertically displaced rollers, of an upwardly-extending trackway comprising spaced guide rails along which the bucket moves and between which said rollers are guided as said bucket moves to and from loading position, the lower of said rails making substantially a constant angle with a horizontal plane adjacent the bucket loading position, and the upper of said rails diverging therefrom and making a decreasing angle with said horizontal plane as it approaches the bucket loading position, the upper of said rollers coming to rest adjacent the upper of said rails and the lower of said rollers coming to rest upon the lower of said rails when the bucket reaches a loading position.

18. In hoisting apparatus, the combination with a bucket provided with vertically displaced rollers, of an upwardly-extending trackway comprising spaced guide rails along which the bucket moves and between which said rollers are guided as said bucket moves to and from loading position, the lower of said rails making substantially a constant angle with a horizontal plane adjacent the bucket loading position, and the upper of said rails diverging therefrom and making a decreasing angle with said horizontal plane as it approaches the bucket loading position, one of said rollers coming to rest adjacent the upper of said rails and the other of said rollers coming to rest upon the lower of said rails when the bucket reaches a loading position.

19. In hoisting apparatus, the combination with a bucket provided with rollers, of an upwardly-extending trackway comprising spaced guide rails along which the bucket moves and between which said rollers are guided as said bucket moves to and from loading position, said rails extending along divergent paths adjacent the bucket loading position, a bail comprising a plurality of pivoted links pivoted at one end to the lower part of said bucket and carrying a roller at the other end, said bail roller moving in a path along one of said divergent rails when said bucket approaches a loading position, one of said bail links tending to rotate said bucket about one of said bucket rollers as said bucket is lifted from said loading position.

20. In hoisting apparatus, the combination with a bucket provided with vertically displaced rollers, of an upwardly-extending trackway comprising spaced guide rails along which the bucket moves and between which said rollers are guided as said bucket moves to and from loading position, the lower of said rails making substantially a constant angle with a horizontal plane adjacent the bucket loading position, and the upper of said rails diverging therefrom and making a decreasing angle with said horizontal plane as it approaches the bucket loading position, a bail comprising a plurality of pivoted links pivoted at one end to the lower part of said bucket and carrying a roller at the other end, said bail roller moving in a path along the upper of said rails when said bucket moves to a loading position, the upper of said bucket rollers following said upper rail and the lower of said bucket rollers following said lower rail as the bucket moves to a loading position, one of said bail links tending to rotate said bucket about the axis of said lower bucket roller and moving said upper bucket roller away from said upper rail and towards said lower rail preliminary to the lifting of said bucket from said loading position.

21. In hoisting apparatus, the combination with a bucket provided with vertically spaced rollers, of an upwardly-extending trackway comprising spaced guide rails along which the bucket moves and between which said rollers are guided as said bucket moves to and from loading position, the lower of said rails making substantially a constant angle with a horizontal plane adjacent the bucket loading position, and the upper of said rails diverging therefrom and making a decreasing angle with said horizontal plane as it approaches the bucket loading position, the upper of said rollers following the upper rail and coming to rest adjacent thereto and the lower of said rollers following the lower rail and coming to rest thereagainst, when the bucket moves to a loading position.

22. In hoisting apparatus, the combination with a bucket provided with vertically spaced rollers, of an upwardly-extending trackway comprising spaced guide rails along which the bucket moves and between which the rollers are guided as the bucket moves to and from loading position, said rails being spaced apart a distance approximately equal to the diameter of said rollers throughout most of the upward portion of the trackway and following more widely separated paths adjacent the bucket loading position at which position each rail is inclined to the vertical, the upper of said rollers coming to rest adjacent the upper of said rails and the lower of said rollers coming to rest upon the lower of said rails when the bucket reaches the loading position.

23. In hoisting apparatus, the combination with a bucket having a bail and provided with vertically spaced rollers, of an upwardly-extending trackway comprising spaced guide rails along which the bucket moves and between which the rollers are guided as the bucket moves to and from loading position, a guide roller on said bail, one of said guide rails also comprising a guide for said bail guide roller, said rails being spaced apart a distance approximately equal to the diameter of said rollers throughout most of the upward portion of the trackway and following more widely separated paths adjacent the bucket loading position at which position each rail is inclined to the vertical, the upper of said bucket rollers coming to rest adjacent the upper of said rails and the lower of said rollers coming to rest upon the lower of said rails when the bucket reaches the loading position.

ORVAL R. STRAWN.